(12) United States Patent
Smith et al.

(10) Patent No.: US 7,278,009 B2
(45) Date of Patent: Oct. 2, 2007

(54) TIERED SEQUENTIAL PROCESSING MEDIA DATA THROUGH MULTIPLE PROCESSOR CHAINS WITH LONGEST PATH TIER ASSIGNMENT OF PROCESSORS

(75) Inventors: Geoffrey R Smith, Mountain View, CA (US); Hans-Martin Krober, San Jose, CA (US); Michael D. Dodd, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 184 days.

(21) Appl. No.: 11/095,201

(22) Filed: Mar. 31, 2005

(65) Prior Publication Data

US 2006/0230406 A1 Oct. 12, 2006

(51) Int. Cl.
*G06F 15/80* (2006.01)
(52) U.S. Cl. .................. 712/19; 713/502; 718/102
(58) Field of Classification Search ............... None
See application file for complete search history.

(56) References Cited

U.S. PATENT DOCUMENTS

| | | | | | |
|---|---|---|---|---|---|
| 5,317,735 | A | * | 5/1994 | Schomberg | ............... 712/203 |
| 6,119,215 | A | * | 9/2000 | Key et al. | ................. 712/19 |
| 2005/0204215 | A1 | * | 9/2005 | Tukiainen | .............. 714/712 |

* cited by examiner

*Primary Examiner*—Kenneth S. Kim

(57) ABSTRACT

Tiered command distribution is described. In an embodiment, a pipeline architecture includes processor chains of data processors that process control events received from an application interface control. A tier assignment algorithm determines the longest path of data processors through the processor chains to determine a tier allocation for each data processor in the set of processor chains. Each tier includes a data processor from one or more of the processor chains where a first set of data processors in a first tier each receive a control event and process the control event and/or process the data according to the control event before a second set of data processors in a second tier each receive the control event.

17 Claims, 6 Drawing Sheets

TIERED SEQUENTIAL PROCESSING MEDIA DATA THROUGH MULTIPLE PROCESSOR CHAINS WITH LONGEST PATH TIER ASSIGNMENT OF PROCESSORS

TECHNICAL FIELD

This invention relates to processor chains and the distribution of data processing commands.

BACKGROUND

Pipeline architectures are implemented to process data and include processor chains (also commonly referred to as "graphs") that pass data and commands through an ordered chain of data processors which each perform a designated data processing function. As such, data inputs to a pipeline architecture enter at one or more defined processing point(s) (e.g., a first data processor), and data outputs from the pipeline architecture are expected at one or more defined processing point(s) (e.g., an N-data processor in the processor chain).

Typically, the data links that connect the data processors of a processor chain are used to communicate both the data to be processed and command traffic, such as data instructions that act upon a data processor to modify an internal state or an operation that the data processor performs to process the data. The command traffic is communicated through a processor chain from an input to the output of each data processor in the chain such that each data processor affected by a command message will have the chance to operate on it.

This simple pipeline architecture design can produce unexpected data outputs and data processing errors when there are data processors that have multiple outputs and/or multiple inputs. A data processor within a processor chain may split a data input and then pass the data sub-streams through different data processors of different processor chains which are then re-unified at a later processing point in the chain.

These data processing splits can cause command traffic management issues that may result in unexpected data outputs and data processing errors. For example, the data processor that receives the data sub-streams and merges together the data from the two different processor chains may receive as many copies of each command as there are processor chains which input into it, thus causing errors in the data processing for non-idempotent commands. Another potential issue is that some data processors in a-processor chain may act on a command message before all of the preceding processors that provide an input to them have completed acting on the command message which may also cause unexpected data outputs and data processing errors.

SUMMARY

Tiered command distribution is described herein.

In an implementation of tiered command distribution, a pipeline architecture includes processor chains of data processors that process control events received from an application interface control. For example, the pipeline architecture can be implemented to include processor chains of media processors to process media data, such as audio and video data, in a media device. A tier assignment algorithm determines a longest path of data processors in the processor chains to reach any particular data processor. The length count of the path specifies the tier allocation for each data processor. This is repeated for each processor chain. Each tier includes a data processor from one or more of the processor chains where a first set of data processors in a first tier each receive a control event and process the control event and/or process incoming data according to the control event before a second set of data processors in a second tier each receive the control event. This ensures that data processed through a processor chain is handled consistently, because the internal states of the respective data processors, as managed by the control events, will be matched for all data processors as the data passes through the processor chain.

BRIEF DESCRIPTION OF THE DRAWINGS

The same numbers are used throughout the drawings to reference like features and components.

DETAILED DESCRIPTION

Tiered command distribution is implemented for data processing within a pipeline architecture to handle and distribute control events for data processing on a tier-by-tier basis, and to manage the issues of replicated commands and unresolved upstream operations. The data processors of processor chains in the pipeline architecture receive control events on a tier-by-tier basis such that the allocated tiers manage effects introduced by chain splitting, variable length processor chains, and processor chain recombination, such as those introduced by the processor chain topology shown in FIG. 1. As such, control events are not repeated at any data processor, and when a particular data processor receives a control event, all of the previous data processors that the particular data processor receives an input from have already processed or handled the control event. In an embodiment of tiered command distribution, a pipeline architecture is implemented in a media device with processor chains that include media processors to process media data, such as audio and video data, closed captioning data, teletext data, and/or any other type of media data.

While aspects of the described systems and methods for tiered command distribution can be implemented in any number of different computing systems, environments, and/or configurations, embodiments of tiered command distribution are described in the context of the following exemplary system architectures.

Figure 1:
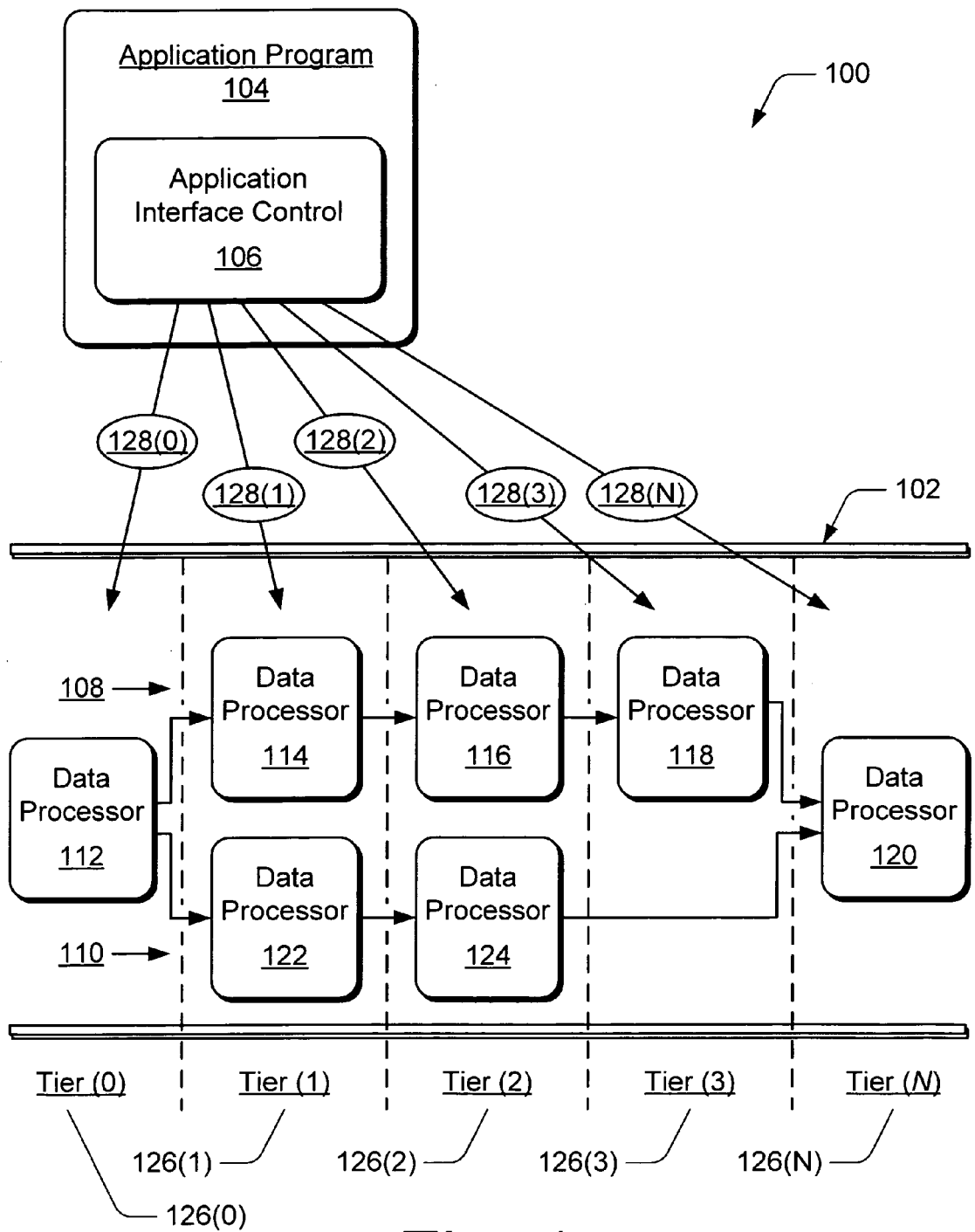
FIG. 1 illustrates an exemplary tiered command distribution system.

FIG. 1 illustrates an exemplary tiered command distribution system 100 which includes a pipeline architecture 102 via which data is processed, and includes an application program 104 that has an application interface control 106. In this example, the pipeline architecture 102 includes a processor chain 108 and a processor chain 110, each of which includes data processors that process data. For example, processor chain 108 includes data processors 112, 114, 116, 118, and 120 that are configured to sequentially process data through processor chain 108. Similarly, processor chain 110 includes data processors 112, 122, 124, and 120 that are configured to sequentially process data through processor chain 110.

In an embodiment of tiered command distribution, system 100 is implemented in a media server and the processor chains 108 and 110 form the pipeline architecture 102 in the media server to process media data for distribution. The data processors of each processor chain 108 and 110 are media processors that process media data in the media server, such as real-time audio and video data, closed captioning data, teletext data, and/or any other type of media data that is processed through the processor chains 108 and 110 as the data is received.

The data processors of the processor chains 108 and 110 are allocated into tiers 126(0-N) in the pipeline architecture 102, and each tier 126(0-N) has a tier identifier "Tier(0)" through "Tier(N)". The tiered command distribution system 100 includes as many tiers 126(0-N) as the number of data processors in the longest processor chain of the pipeline architecture 102 (i.e., the processor chain that includes the most data processors). For example, processor chain 108 includes five data processors (i.e., data processors 112, 114, 116, 118, and 120), while processor chain 110 includes only four data processors (i.e., data processors 112, 122, 124, and 120). Thus, in this example, the tiered command distribution system 100 includes five tiers identified as "Tier(0)" through "Tier(N)" where N=4 in this example such that "Tier(N)" would be "Tier(4).

Although the tier identifiers in this example are numeric identifiers (e.g., "Tier(0-N)" where N+1 is the number of data processors in the longest processor chain), a tier identifier may be implemented as any type of number, text, with any numeric range, or combination thereof which supports a unique ordering of the tiers 126(0-N). In this example, a particular tier identifier corresponds to the number of data processors in a processor chain along the longest path from a first data processor to a data processor in the tier that is associated with the tier identifier. For example, tier identifier "Tier(3)" corresponds to the third data processor (e.g., data processor 118) from the first data processor 112 in processor chain 108.

Each of the tiers 126(0-N) include one or more data processors, and each tier 126 includes a data processor from one or more of the processor chains. For example, Tier(1) includes two data processors 114 and 122 which is data processor 114 from processor chain 108 and data processor 112 from processor chain 110. Additionally, Tier(3) includes one data processor 118 from processor chain 108.

The application program 104 includes the application interface control 106 that initiates and communicates control events 128(0-N) (also referred to as "commands") to each of the respective tiers 126(0-N). As data is processed through the processor chains 108 and 110 of the pipeline architecture 102 (e.g., from the output of one data processor into the input of a next data processor), the control events 128(0-N) are communicated for sequential tier processing by the data processors in each respective tier 126(0-N), and according to the tier allocation of the data processors of each processor chain 108 and 110 in the pipeline architecture 102. For example, a first set of data processors 114 and 122 in Tier(1) are each configured to receive a control event 128(1) and process or handle the control event 128(1) before a second set of data processors 116 and 124 in subsequent Tier(2) each receive the control event 128(2). Processing or handling a control event by a data processor may include processing data according to the control event.

The control events 128(0-N) are initiated by the application program 104 (e.g., the service owner) synchronously in the sequential processing order of the tiers 126(0-N). Additionally, a control event 128 is not communicated to the data processors in a subsequent tier until all of the data processors in a preceding tier have processed the data according to the control event. In an embodiment of tiered command distribution, the application interface control 106 receives an indication, or feedback, from each data processor in a particular tier that the processing associated with a control event has been completed.

In this example of tiered command distribution, when a data processor processes a control event 128, all of the processor elements preceding the data processor have already processed the control event 128. This prevents data processing errors introduced by command reordering or replication through the pipeline architecture 102. For example, in the media server embodiment, data processor 112 receives audio and video data which is split such that the media processors (e.g., data processors) of processor chain 108 process the video data while the media processors of processor chain 110 process the audio data. The control events 128(0-N) are communicated to the respective tiers 126(0-N) so that the commands are synchronously executed and such that the video data and the audio data are matched and synchronously executed when re-unified at data processor 120. As described, tiered command distribution is implemented for acyclic processor graphs.

To implement the pipeline architecture 102, the data processors in processor chains 108 and 110 each register with the application interface control 106 when a data processor is instantiated, and the data processor is allocated to one of the tiers 126(0-N). To register with the service owner (e.g., application program 104), a data processor calls a register API method and provides an identifier of the data processor, the data inputs to the data processor, and the data outputs from the data processor. For example, data processor 118 in Tier(3) may provide the data processor identifier "118", one video data input, and one video data output, where the inputs and outputs are each identified by a unique identifier (ID). Similarly, data processor 120 in Tier(N) (e.g., N=4 in this example) may provide the data processor identifier "120", both a video data input and an audio data input, and one multiplexer ("mux") output to indicate an audio and video combination output.

To allocate a registered data processor to one of the tiers 126(0-N), the service owner first determines whether the data processor has at least one input from another data processor in the processor chain. If not, the data processor is allocated to Tier(0). For example, data processor 112 does not have an input from the processor graph, but rather, may generate data intrinsically such as from a disk or capture source, for example. Data processor 112 is therefore allocated to Tier(0) at the start of the processor chains 108 and 110. If the data processor has one or more inputs, then the data processor is allocated to a tier that is subsequent to the highest tier from which the data processor receives an input. For example, data processor 118 receives an input from data processor 116 in Tier(2) which is the highest tier from which data processor 118 receives an input. Thus, data processor 118 is allocated to Tier(3) (i.e., Tier(2)+one Tier level).

In this example, the application interface control 106 communicates a control event 128 to a data processor via an API method of the data processor to handle data and/or control events. For example, each of the data processors 114 and 122 in Tier(1) expose a "handle event" method that can be called by the application interface control 106 to initiate control event 128(1). The application interface control 106 communicates a type of an event (e.g., such as "start", "stop", "skip forward", "flush buffers", etc.), and object data that is dependent upon the type of event (e.g., "10 seconds" for a "skip forward" type of event). Additionally, the functionality to handle control events may implemented by any number of alternative embodiments.

Figure 2:
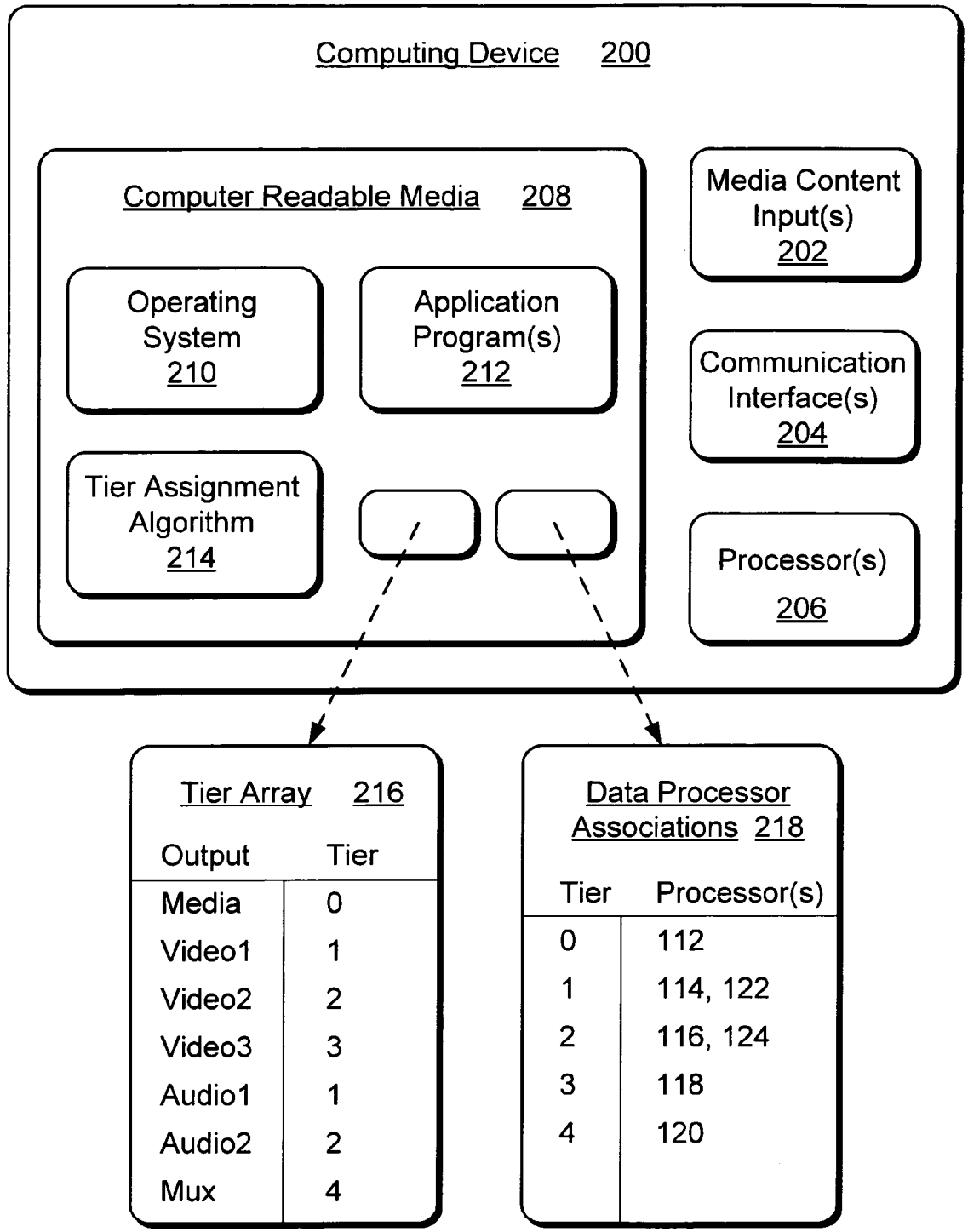
FIG. 2 illustrates various components of an exemplary computing device in which embodiments of tiered command distribution can be implemented.

FIG. 2 illustrates various components of an exemplary computing device 200 in which embodiments of tiered command distribution can be implemented. Computing device 200 can also be implemented as any form of computing or electronic device with any number and combination of differing components as described below with reference to the exemplary computing environment 600 shown in FIG. 6.

The computing device 200 includes one or more media content inputs 202 which may include Internet Protocol (IP) inputs over which streams of media content are received via an IP-based network. Computing device 200 further includes communication interface(s) 204 which can be implemented as any one or more of a serial and/or parallel interface, a wireless interface, any type of network interface, a modem, and as any other type of communication interface. A wireless interface enables computing device 200 to receive control input commands and other information from an input device, such as from a remote control device or from another infrared (IR), 802.11, Bluetooth, or similar RF input device.

A network interface provides a connection between computing device 200 and a communication network by which other electronic and computing devices can communicate data with computing device 200. Similarly, a serial and/or parallel interface provides for data communication directly between computing device 200 and the other electronic or computing devices. A modem facilitates device 200 communications with other electronic and computing devices via a conventional telephone line, a DSL connection, cable, and/or other type of connection.

Computing device 200 also includes one or more processors 206 (e.g., any of microprocessors, controllers, and the like) which process various computer executable instructions to control the operation of computing device 200, to communicate with other electronic and computing devices, and to implement embodiments of tiered command distribution. Computing device 200 can be implemented with computer readable media 208, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 208 provides data storage mechanisms to store various information and/or data such as software applications and any other types of information and data related to operational aspects of computing device 200. For example, an operating system 210 and/or other application programs 212 can be maintained as software applications with the computer readable media 208 and executed on processor(s) 206 to implement embodiments of tiered command distribution.

For example, computer readable media 208 maintains a tier assignment algorithm 214, and also maintains a tier array 216 and data processor associations 218 to implement embodiments of tiered command distribution. The tier assignment algorithm 214 can be implemented to determine a longest path of data processors in the processor chains 108 and 110 (FIG. 1) of the pipeline architecture 102 to determine a tier allocation of the data processors of each processor chain. For example, the data processors in a processor chain can be ranked, or allocated, as being in a particular tier, each of which is indicated by a number or any other type of tier identifier. The higher the allocated tier number, the more intermediate data processors there are from the first data processor of a processor chain along the longest path from the first data processor to a data processor in a tier associated with the tier identifier.

The tier array 216 includes a list of the data processor outputs that are associated with a particular tier 126(0-N) of the pipeline architecture 102. For the media server example, processor chain 108 includes media processors (e.g., the data processors) to process video data, and processor chain 110 includes media processors to process audio data. Referring to the tier array 216, a Media output in Tier(0) identifies the data outputs of data processor 112, a Video1 output in Tier(1) identifies the data output of data processor 114, and so on until a Mux output in Tier(4) (e.g., N=4 in this example) identifies the data output of data processor 120. The data processor associations 218 includes a list of the data processors that are each allocated to the particular tiers 126(0-N). For example, Tier(2) includes data processor 116 and data processor 124 which are associated with Tier(2) in the data processor associations 218.

Methods for tiered command distribution, such as exemplary methods 300 and 400 described with reference to respective FIGS. 3 and 4, may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 3:
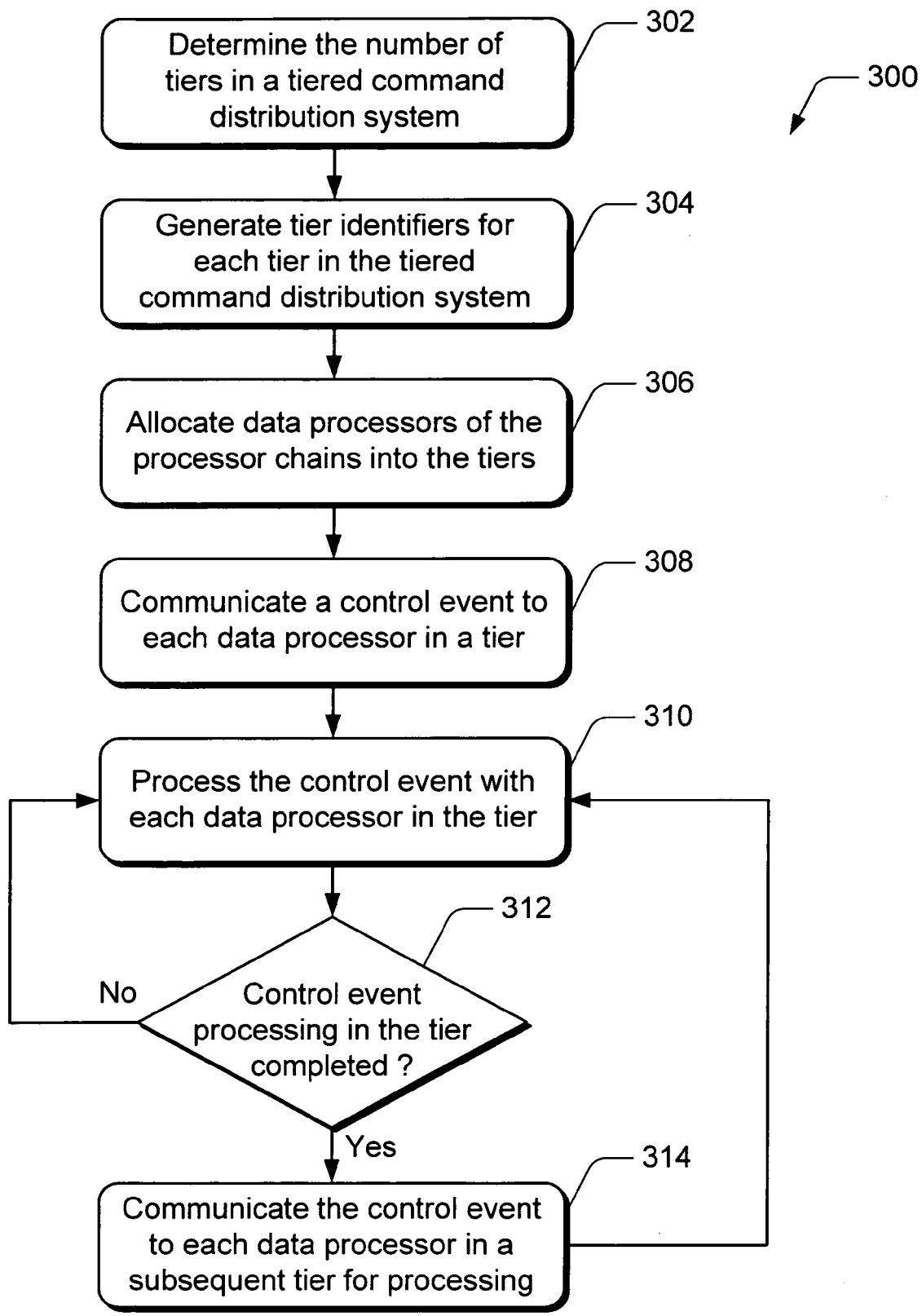
FIG. 3 is a flow diagram that illustrates an exemplary method for tiered command distribution, and includes a distribution of control events given the allocation of data processors into tiers of a tiered command distribution system.

FIG. 3 illustrates an exemplary method 300 for tiered command distribution. The order in which the method is described is not intended to be construed as a limitation, and any number of the described method blocks can be combined in any order to implement the method. Furthermore, the method can be implemented in any suitable hardware, software, firmware, or combination thereof.

At block 302, a number of the tiers in a tiered command distribution system are determined. The number of tiers is determined as the number of data processors in the longest processor chain (i.e., this is the processor chain having the longest path of data processors in a pipeline architecture). For example, processor chain 108 includes the longest path of data processors (e.g., five data processors) in the pipeline architecture 102 (FIG. 1) and the tiered command distribution system 100 includes the five tiers, "Tier(0) through Tier(N)" where N=4 in this example. At block 304, tier identifiers are generated that each correspond to a number of data processors in a processor chain along the longest path from a first data processor to a data processor in a tier that is associated with a tier identifier. For example, "Tier(0)", "Tier(1)", and so on identify the tiers 126(0-N) of the pipeline architecture 102.

At block 306, data processors of the processor chains are allocated into tiers. The tiers each include a data processor from one or more of the processor chains, and the data processors of each processor chain are allocated to a different tier. In an embodiment, the data processors are registered within a tier which contains links to the data processors associated with the tier. For example, Tier(1) includes two data processors 114 and 122 which is data processor 114 from processor chain 108 and data processor 112 from processor chain 110. Further, Tier(3) includes one data processor 118 from processor chain 108.

At block 308, a control event is communicated to each data processor in a tier. The control event can be communicated to each of the data processors in the tier via an API method of each of the respective data processors. For example, the application interface control 106 communicates control events 128(0-N) which are communicated for sequential tier processing by the data processors in each respective tier 126(0-N), and according to the tier allocation of the data processors of each processor chain 108 and 110 in the pipeline architecture 102.

At block 310, each of the data processors in the tier process the control event. Processing the control event may include processing data in the particular tier such that the data is processed through a processor chain of data processors all having a respective state that is internally consistent. As such, the data flow is "gated" through the processor chain tier-by-tier on the control event commands. At block 312, a determination is made as to whether the control event processing has been completed by the data processors in the tier (e.g., each of the data processors have handled the control event). If the control event processing has not been completed by the data processors in the tier (i.e., "no" from block 312), then the set of data processors continue to process the control event at block 310. When the control event has been processed by each of the data processors in the tier (i.e., "yes" from block 312), the control event is communicated to each data processor in a subsequent tier at block 314.

The method 300 continues such that the data processors in each subsequent tier process the control event sequentially. Accordingly, a control event is communicated to each data processor only once and such that a particular data processor receives the control event after all previous data processors that the particular data processor receives an input from have processed or handled the control event.

Figure 4:
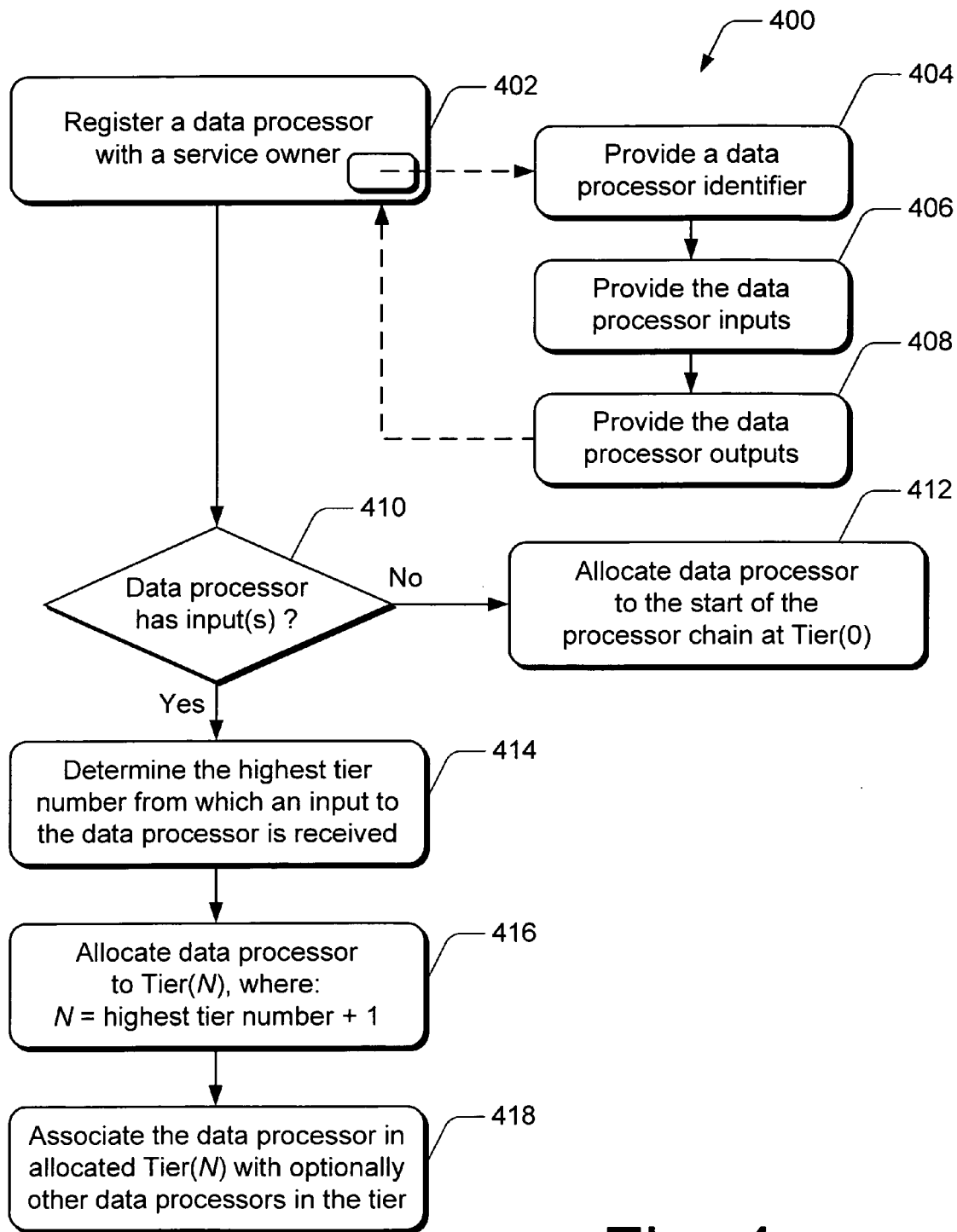
FIG. 4 is a flow diagram that illustrates another exemplary method for tiered command distribution, and includes allocating data processors into different tiers of a tiered command distribution system.

FIG. 4 illustrates an exemplary method 400 for tiered command distribution. The order in which the method is described is not intended to be construed as a limitation, and any number of the described method blocks can be combined in any order to implement the method. Furthermore, the method can be implemented in any suitable hardware, software, firmware, or combination thereof.

At block 402, a data processor registers with a service owner. For example, data processor 114 registers with application program 104 via the application interface control 106 (FIG. 1). The data processor registration includes the data processor 114 providing a data processor identifier at block 404, the data processor providing the inputs to the data processor at block 406, and the data processor providing the outputs from the data processor at block 408.

At block 410, a determination is made as to whether the data processor has at least one input. If the data processor does not have at least one input (i.e., no from block 410), then the data processor is allocated to the tier at the start of the processor chain at block 412. For example, data processor 112 does not have any inputs from the processor graph, but rather, may generate data intrinsically such as from a disk or capture source, for example. As such, data processor 112 is allocated by the tier assignment algorithm 214 to Tier(0) (e.g., the start of the processor chains 108 and 110).

If the data processor does have at least one input (i.e., yes from block 410), then the highest tier number from which an input to the data processor is received is determined at block 414. For example, data processor 118 receives an input from data processor 116 in Tier(2). At block 416, the data processor is allocated to a Tier(N), where N=the highest tier number plus one. For example, data processor 118 is allocated to Tier(3) which is equal to Tier(2+1) (i.e., data processor 118 receives an input from data processor 116 in Tier(2)). At block 418, the data processor is associated in the allocated Tier(N) with, optionally, any other data processors in the same tier. For example, data processor association 218 (FIG. 2) indicates that data processors 116 and 124 are both allocated in Tier(2) as shown in the pipeline architecture 102 in FIG. 1.

Figure 5:
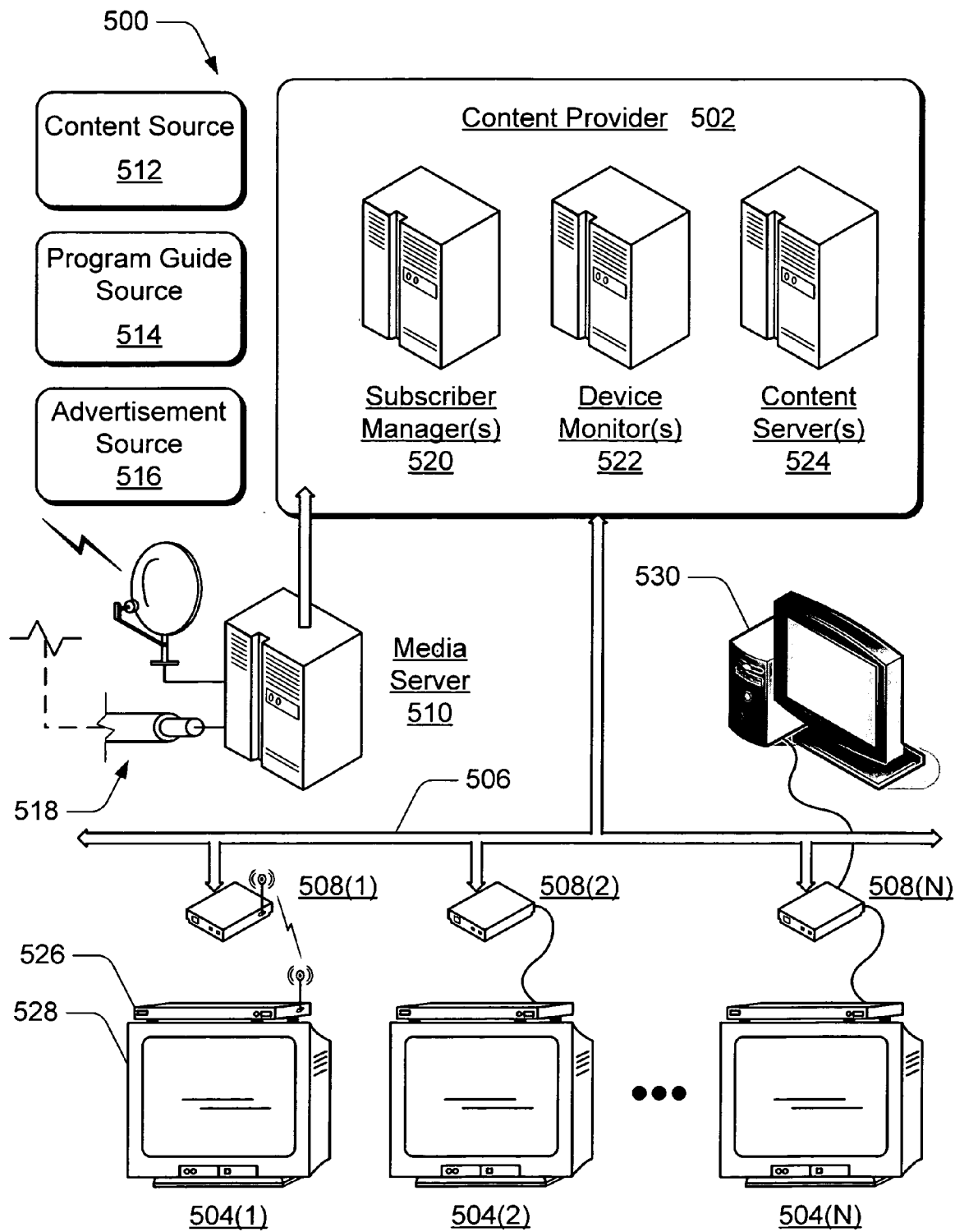
FIG. 5 illustrates various devices and components in an exemplary entertainment and information system in which embodiments of tiered command distribution can be implemented.

FIG. 5 illustrates an exemplary entertainment and information system 500 in which an IP-based television environment can be implemented, and in which embodiments of tiered command distribution can be implemented. System 500 facilitates the distribution of program content, program guide data, and advertising content to multiple viewers. System 500 includes a content provider 502 and television-based client systems 504(1-N) each configured for communication via an IP-based network 506.

The network 506 can be implemented as a wide area network (e.g., the Internet), an intranet, a Digital Subscriber Line (DSL) network infrastructure, or as a point-to-point coupling infrastructure. Additionally, network 506 can be implemented using any type of network topology and any network communication protocol, and can be represented or otherwise implemented as a combination of two or more networks. A digital network can include various hardwired and/or wireless links 508(1-N), routers, gateways, and so on to facilitate communication between content provider 502 and the client systems 504(1-N). The television-based client systems 504(1-N) receive program content, program guide data, advertising content, and the like from content server(s) of the content provider 502 via the IP-based network 506.

System 500 includes a media server 510 that receives program content from a content source 512, program guide data from a program guide source 514, and advertising content from an advertisement source 516. In an embodiment, the media server 510 represents an acquisition server that receives the audio and video program content from content source 512, an EPG server that receives the program guide data from program guide source 514, and/or an advertising management server that receives the advertising content from the advertisement source 516.

The content source 512, the program guide source 514, and the advertisement source 516 control distribution of the program content, the program guide data, and the advertising content to the media server 512 and/or to other television-based servers. The program content, program guide data, and advertising content is distributed via various transmission media 518, such as satellite transmission, radio frequency transmission, cable transmission, and/or via any number of other transmission media. In this example, media server 510 is shown as an independent component of system 500 that communicates the program content, program guide data, and advertising content to content provider 502. In an alternate implementation, media server 510 can be implemented as a component of content provider 502.

Content provider 502 is representative of a headend service in a television-based content distribution system, for example, that provides the program content, program guide data, and advertising content to multiple subscribers (e.g., the television-based client systems 504(1-N)). The content provider 502 can be implemented as a satellite operator, a network television operator, a cable operator, and the like to control distribution of program and advertising content, such as movies, television programs, commercials, music, and other audio, video, and/or image content to the client systems 504(1-N).

Content provider 502 includes various components to facilitate media data processing and content distribution, such as a subscriber manager 520, a device monitor 522, and a content server 524. The subscriber manager 520 manages subscriber data, and the device monitor 522 monitors the client systems 504(1-N) (e.g., the subscribers), and maintains monitored client state information.

Although the various managers, servers, and monitors of content provider 502 (to include the media server 510 in one embodiment) are illustrated and described as distributed, independent components of content provider 502, any one or more of the managers, servers, and monitors can be implemented together as a multi-functional component of content provider 502. Additionally, any one or more of the managers, servers, and monitors described with reference to system 500 can implement tiered command distribution to process data in a tiered pipeline architecture as described with reference to FIGS. 1-4.

The television-based client systems 504(1-N) can be implemented to include a client device 526 and a display device 528 (e.g., a television). A client device 526 of a television-based client system 504 can be implemented in any number of embodiments, such as a set-top box, a digital video recorder (DVR) and playback system, a personal video recorder (PVR), an appliance device, a gaming system, and as any other type of client device that may be implemented in a television-based entertainment and information system. In an alternate embodiment, client system 504(N) is implemented with a computing device 530 as well as a client device 526. Additionally, any of the client devices 526 of a client system 504 can implement tiered command distribution to process data in a tiered pipeline architecture as described with reference to FIGS. 1-4.

Figure 6:
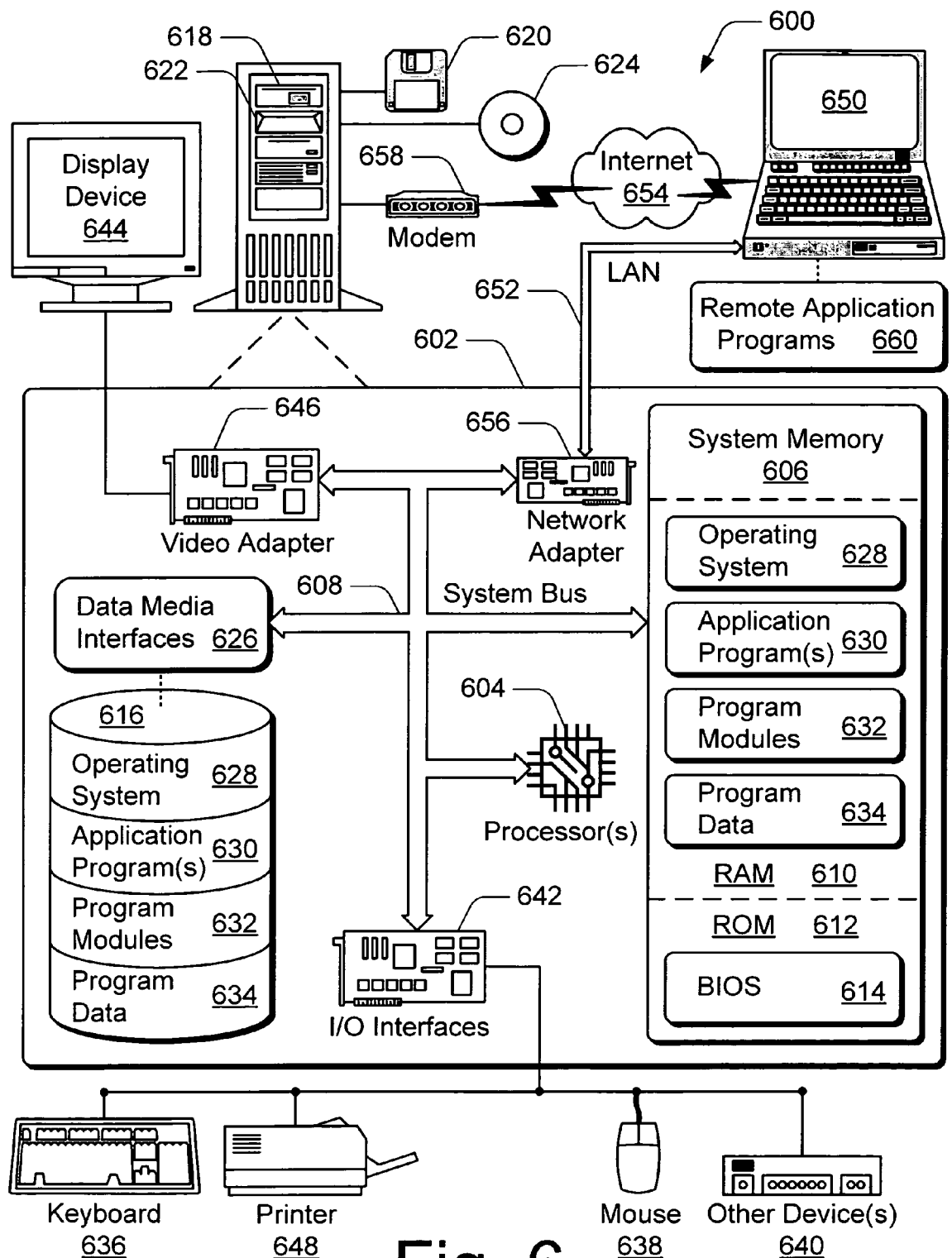
FIG. 6 illustrates exemplary computing systems, devices, and components in an environment that tiered command distribution can be implemented.

FIG. 6 illustrates an exemplary computing environment 600 within which tiered command distribution systems and methods, as well as the computing, network, and system architectures described herein, can be either fully or partially implemented. Exemplary computing environment 600 is only one example of a computing system and is not intended to suggest any limitation as to the scope of use or functionality of the architectures. Neither should the computing environment 600 be interpreted as having any dependency or requirement relating to any one or combination of components illustrated in the exemplary computing environment 600.

The computer and network architectures in computing environment 600 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 600 includes a general-purpose computing system in the form of a computing device 602. The components of computing device 602 can include, but are not limited to, one or more processors 604 (e.g., any of microprocessors, controllers, and the like), a system memory 606, and a system bus 608 that couples the various system components. The one or more processors 604 process various computer executable instructions to control the operation of computing device 602 and to communicate with other electronic and computing devices. The system bus 608 represents any number of several types of bus structures, including a memory bus or memory controller, a peripheral bus, an accelerated graphics port, and a processor or local bus using any of a variety of bus architectures.

Computing environment 600 includes a variety of computer readable media which can be any media that is accessible by computing device 602 and includes both volatile and non-volatile media, removable and non-removable media. The system memory 606 includes computer readable media in the form of volatile memory, such as random access memory (RAM) 610, and/or non-volatile memory, such as read only memory (ROM) 612. A basic input/output system (BIOS) 614 maintains the basic routines that facilitate information transfer between components within computing device 602, such as during start-up, and is stored in ROM 612. RAM 610 typically contains data and/or program modules that are immediately accessible to and/or presently operated on by one or more of the processors 604.

Computing device 602 may include other removable/non-removable, volatile/non-volatile computer storage media. By way of example, a hard disk drive 616 reads from and writes to a non-removable, non-volatile magnetic media (not shown), a magnetic disk drive 618 reads from and writes to a removable, non-volatile magnetic disk 620 (e.g., a "floppy disk"), and an optical disk drive 622 reads from and/or writes to a removable, non-volatile optical disk 624 such as a CD-ROM, digital versatile disk (DVD), or any other type of optical media. In this example, the hard disk drive 616, magnetic disk drive 618, and optical disk drive 622 are each connected to the system bus 608 by one or more data media interfaces 626. The disk drives and associated computer readable media provide non-volatile storage of computer readable instructions, data structures, program modules, and other data for computing device 602.

Any number of program modules can be stored on RAM 610, ROM 612, hard disk 616, magnetic disk 620, and/or optical disk 624, including by way of example, an operating system 628, one or more application programs 630, other program modules 632, and program data 634. Each of such operating system 628, application program(s) 630, other program modules 632, program data 634, or any combination thereof, may include one or more embodiments of the systems and methods described herein.

Computing device 602 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 602 via any number of different input devices such as a keyboard 636 and pointing device 638 (e.g., a "mouse"). Other input devices 640 (not shown specifically) may include a microphone, joystick, game pad, controller, satellite dish, serial port, scanner, and/or the like. These and other input devices are connected to the processors 604 via input/output interfaces 642 that are coupled to the system bus 608, but may be connected by other interface and bus structures, such as a parallel port, game port, and/or a universal serial bus (USB).

A display device 644 (or other type of monitor) can be connected to the system bus 608 via an interface, such as a video adapter 646. In addition to the display device 644, other output peripheral devices can include components such as speakers (not shown) and a printer 648 which can be connected to computing device 602 via the input/output interfaces 642.

Computing device 602 can operate in a networked environment using logical connections to one or more remote computers, such as remote computing device 650. By way of example, remote computing device 650 can be a personal computer, portable computer, a server, a router, a network computer, a peer device or other common network node, and the like. The remote computing device 650 is illustrated as a portable computer that can include any number and combination of the different components, elements, and features described herein relative to computing device 602.

Logical connections between computing device 602 and the remote computing device 650 are depicted as a local area network (LAN) 652 and a general wide area network (WAN) 654. Such networking environments are commonplace in offices, enterprise-wide computer networks, intranets, and the Internet. When implemented in a LAN networking environment, the computing device 602 is connected to a local network 652 via a network interface or adapter 656. When implemented in a WAN networking environment, the computing device 602 typically includes a modem 658 or other means for establishing communications over the wide area network 654. The modem 658 can be internal or external to computing device 602, and can be connected to the system bus 608 via the input/output interfaces 642 or other appropriate mechanisms. The illustrated network connections are merely exemplary and other means of establishing communication link(s) between the computing devices 602 and 650 can be utilized.

In a networked environment, such as that illustrated with computing environment 600, program modules depicted relative to the computing device 602, or portions thereof, may be stored in a remote memory storage device. By way of example, remote application programs 660 are maintained with a memory device of remote computing device 650. For purposes of illustration, application programs and other executable program components, such as operating system 628, are illustrated herein as discrete blocks, although it is recognized that such programs and components reside at various times in different storage components of the computing device 602, and are executed by the one or more processors 604 of the computing device 602.

Although embodiments of tiered command distribution have been described in language specific to structural features and/or methods, it is to be understood that the subject of the appended claims is not necessarily limited to the specific features or methods described. Rather, the specific features and methods are disclosed as exemplary implementations of tiered command distribution.

The invention claimed is:

1. A tiered command distribution system, comprising:
   a pipeline architecture that includes processor chains of media processors configured to process media data in a media device;
   a tier assignment module configured to determine a longest path of media processors in the processor chains to determine a tier allocation of the media processors of each processor chain;
   tiers of one or more media processors to sequentially process the media data, each tier including a media processor from one or more of the processor chains, and each tier configured to receive a control event; and
   a first set of media processors in a first tier each configured to receive the control event and process the control event before a second set of media processors in a second tier each receive the control event such that dataflow of the media data is managed in a processor chain with the control event being received by each media processor that affects the media data.

2. A tiered command distribution system as recited in claim 1, wherein the tiered command distribution system includes as many tiers as a number of media processors in a longest processor chain that includes the most media processors of the pipeline architecture.

3. A tiered command distribution system as recited in claim 1, wherein a tier identifier corresponds to a number of media processors in a processor chain along the longest path from a first media processor to a media processor in a tier that is associated with the tier identifier.

4. A tiered command distribution system as recited in claim 1, further comprising an application interface control configured to communicate the control event to a media processor via an API method of the media processor such that the dataflow of the media data is regulated through the tiered command distribution system.

5. A system comprising:
   a pipeline architecture to process data;
   processor chains of the pipeline architecture that each include data processors ordered for sequential processing of control events according to tier allocation of the data processors of each processor chain in the system which includes as many tiers as a number of data processors in a longest processor chain that includes the most data processors; and
   a tier assignment module configured to determine the longest processor chain to determine the tier allocation of the data processors of each processor chain.

6. A system as recited in claim 5, wherein:
   the data includes audio and video media data; and
   the processor chains form a the pipeline architecture in a media device configured to process the audio and video media data according to the control events.

7. A system as recited in claim 5, wherein the data processors of a processor chain are media processors configured to process media data in a media device, and wherein the media data is real-time audio and video data that is processed through the processor chains as it is received.

8. A system as recited in claim 5, wherein a data processor in a first processor chain is associated in a tier with an additional data processor from a second processor chain, and wherein the data processor and the additional data processor each receive a control event and process the control event before data processors that are associated in a subsequent tier receive the control event.

9. A system as recited in claim 5, wherein a tier identifier of a tier corresponds to a number of data processors in a longest processor chain from a first data processor to a data processor in the tier that is associated with the tier identifier.

10. A system as recited in claim 5, wherein a first set of data processors in a first tier are each configured to receive a control event and process the control event before a second set of data processors in a subsequent tier each receive the control event.

11. A system as recited in claim 5, further comprising an application interface control configured to communicate the control events to a data processor via an API method of the data processor.

12. A method, comprising:
    allocating data processors of processor chains into tiers that each include a data processor from one or more of the processor chains, the data processors being allocated into tiers by a tier assignment module that determines a number of the tiers as a number of data processors in a longest processor chain;
    processing data through a pipeline architecture that includes the processor chains of data processors; and
    communicating control events to the tiers for sequential processing of the control events according to tier allocation of the data processors of each processor chain such that the data processors in a tier process a control event before additional data processors in a subsequent tier receive and process the control event, and such that a data processor state for each respective data processor is consistent as the data is processed through the pipeline architecture.

13. A method as recited in claim 12, wherein communicating the control events includes communicating a control event to each data processor only once, and wherein a particular data processor receives the control event after all previous data processors that the particular data processor receives an input from have processed the control event.

14. A method as recited in claim 12, wherein allocating the data processors includes determining a longest path of data processors in the processor chains to allocate the data processors of each processor chain to a different tier.

15. A method as recited in claim 12, further comprising generating a tier identifier that corresponds to a number of data processors in a processor chain along the longest path from a first data processor to a data processor in a tier that is associated with the tier identifier.

16. A method as recited in claim 12, wherein processing the data includes processing real-time audio and video media data through the pipeline architecture in a media device as the real-time audio and video media data is received.

17. A method as recited in claim 12, wherein communicating the control events includes communicating the control events to each of the data processors via an API method of each of the respective data processors.

* * * * *